(12) United States Patent
Shaw

(10) Patent No.: US 6,601,894 B2
(45) Date of Patent: Aug. 5, 2003

(54) MOBILE CHIROPRACTIC VEHICLE

(76) Inventor: Kevin Shaw, 94 High St., Newton, NJ (US) 07860

( * ) Notice: Subject to any disclaimer, the term of this patent is extended or adjusted under 35 U.S.C. 154(b) by 0 days.

(21) Appl. No.: 09/814,033

(22) Filed: Mar. 22, 2001

(65) Prior Publication Data

US 2002/0135193 A1 Sep. 26, 2002

(51) Int. Cl.[7] ................................................. B60P 3/00
(52) U.S. Cl. ..................................... 296/24.1; 296/181
(58) Field of Search .............................. 296/24.1, 181, 296/26.01, 26.04, 156, 160, 162, 164, 168

(56) References Cited

U.S. PATENT DOCUMENTS

| | | | | |
|---|---|---|---|---|
| 3,050,330 A | * | 8/1962 | Willson | 296/156 |
| 3,608,954 A | * | 9/1971 | Lynd | 296/26.05 |
| 4,133,572 A | * | 1/1979 | Robbins et al. | 296/24.1 |
| 4,771,305 A | * | 9/1988 | Potoroka | 296/24.1 |
| 4,915,435 A | * | 4/1990 | Levine | 296/24.1 |
| 5,314,200 A | * | 5/1994 | Phillips | 296/24.1 |
| 5,507,122 A | * | 4/1996 | Aulson | 296/24.1 |
| 5,706,616 A | * | 1/1998 | Fernandez | 296/24.1 |
| 5,727,353 A | * | 3/1998 | Getz et al. | 296/24.1 |
| 5,755,478 A | * | 5/1998 | Kamiya et al. | 296/24.1 |
| 5,904,339 A | * | 5/1999 | Flinn | 254/88 |
| 5,967,583 A | * | 10/1999 | Wishart | 296/24.1 |
| 6,039,377 A | * | 3/2000 | Eberspacher | 296/24.1 |
| 6,209,939 B1 | * | 4/2001 | Wacker | 296/24.1 |
| 6,299,229 B1 | * | 10/2001 | Becenas Nieto | 296/24.1 |
| 6,302,475 B1 | * | 10/2001 | Anderson | 296/175 |

* cited by examiner

Primary Examiner—Stephen T. Gordon
Assistant Examiner—Greg Blankenship
(74) Attorney, Agent, or Firm—Alfred C. Hill

(57) ABSTRACT

A mobile chiropractic vehicle comprising a rectangular enclosure have two opposed end walls, two opposed lateral walls, a ceiling and a floor defining an interior area; at least one axle having a pair of wheels, each on opposite ends of the axle, the at least one axle being secured transversely to the rectangular enclosure adjacent the floor to enable movement of the rectangular enclosure; a first arrangement associated with one of the two opposed end walls to transport the rectangular enclosure to selected locations; a second arrangement associated with the other of the two opposed end walls to provide handicapped access to the rectangular enclosure; and a retractable arrangement disposed between the two opposed lateral walls in a spaced relationship with the two opposed end walls to divide the interior area into a patient waiting area adjacent the second arrangement and an examining, diagnostic and adjusting area adjacent the one of the two opposed end walls when the retractable arrangement is closed and a viewing area for a multimedia chiropractic presentation projected on a screen adjacent the one of the two opposed end walls when the retractable arrangement is open.

15 Claims, 3 Drawing Sheets

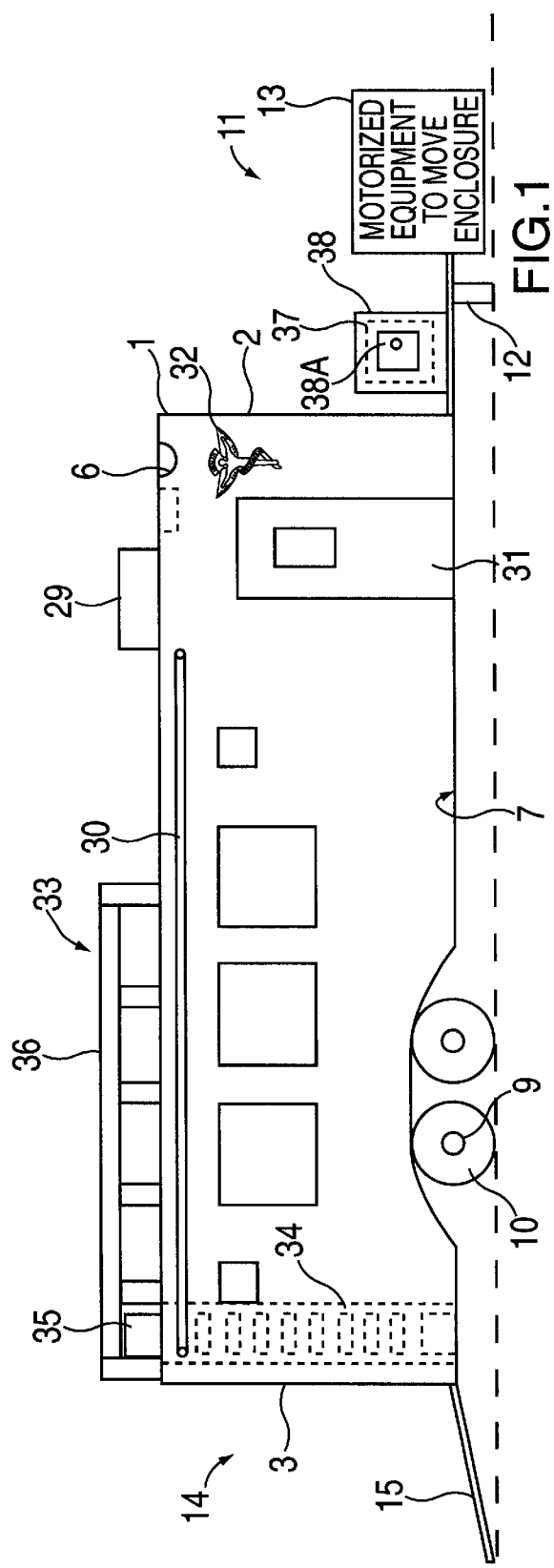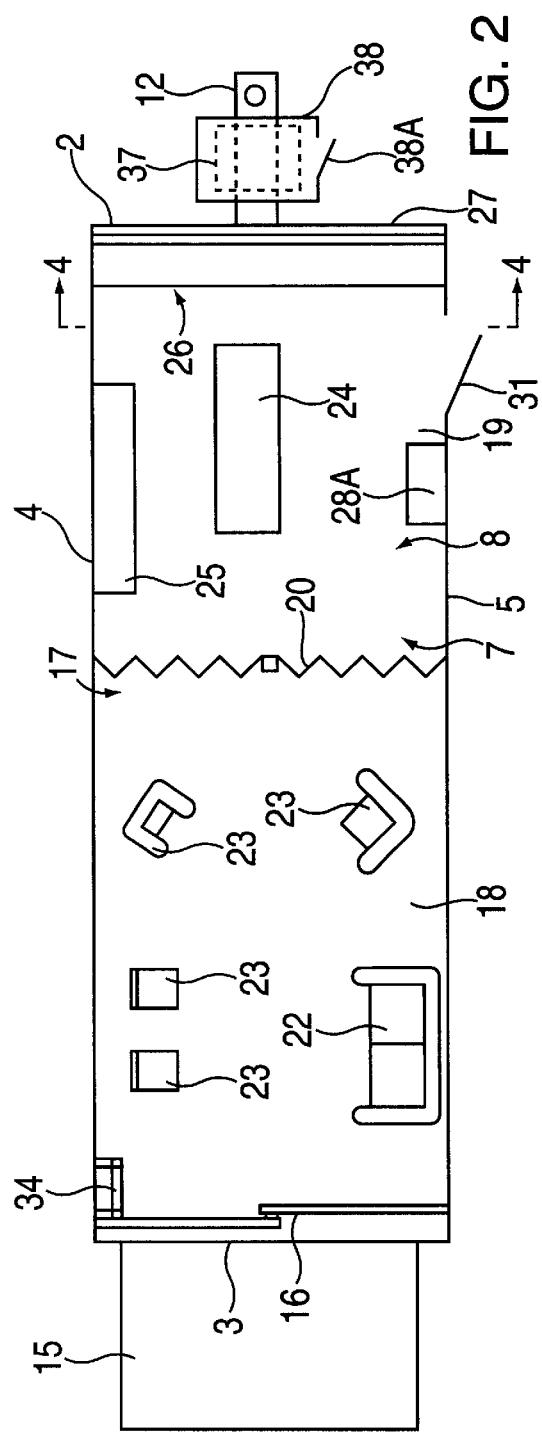

MOBILE CHIROPRACTIC VEHICLE

BACKGROUND OF THE INVENTION

The present invention relates to mobile healthcare vehicles and more particularly to a mobile chiropractic vehicle.

It is known that there are portable medical diagnostic suites, portable emergency care facilities, mobile computerized mammography units, mobile operating room with pre and post operation areas and mobile motorcoach office vehicles. However, the known prior art does not disclose a mobile chiropractic unit capable of providing diagnosis and treatment on the spot, or a multimedia theater for education purposes.

SUMMARY OF THE INVENTION

An object of the present invention is to provide a mobile chiropractic vehicle.

Another object of the present invention is to provide a mobile chiropractic vehicle for the treatment of individuals at industrial sites, professional complexes, senior citizen homes and private residences.

Still another object of the present invention is to provide a moble chiropractic vehicle whose purpose is to promote the education and practice of chiropractic for demonstration at health, public fairs and academic facilities as well as sporting events.

A further object of the present invention is to provide a mobile chiropractic vehicle for treatment and diagnosis at site locations with a variety of options as far as diagnostics are concerned.

Still a further object of the present invention is to provide a moble chiropractic vehicle which in addition to the above objects provides a chiropractic multimedia theater in which a multimedia presentation with digital projection including pictures, voice and music is joined to present a digital multimedia feature presentation on chiropractic.

A feature of the present invention is the provision of a mobile chiropractic vehicle comprising a rectangular enclosure having two opposed end walls, two opposed lateral walls, a ceiling and a floor defining an interior area; at least one axle having a pair of wheels, each on opposite ends of the axle, the at least one axle being secured transversely to the rectangular enclosure adjacent the floor to enable movement of the rectangular enclosure; a first arrangement associated with one of the two opposed end walls to transport the rectangular enclosure to selected locations; a second arrangement associated with the other of the two opposed end walls to provide handicapped access to the rectangular enclosure; and a retractable arrangement disposed between the two opposed lateral walls in a spaced relationship with the two opposed end walls to divide the interior area into a patient waiting area adjacent the second arrangement and an examining, diagnostic and adjusting area adjacent the one of the two opposed end walls when the retractable means is closed and a viewing area for a multimedia chiropractic presentation projected on the one of the two opposed end walls when the retractable means is open.

BRIEF DESCRIPTION OF THE DRAWING

Above-mentioned and other features and objects of the present invention will become more apparent by reference to the following description taken in conjunction with the accompanying drawing, in which:

FIG. 1 is a side view of the mobile chiropractic vehicle in accordance with the principles of the present invention;

FIG. 2 is a floor plan of the mobile chiropractic vehicle of FIG. 1 with the retractable means closed;

DESCRIPTION OF THE PREFERRED EMBODIMENT

Figure 3:
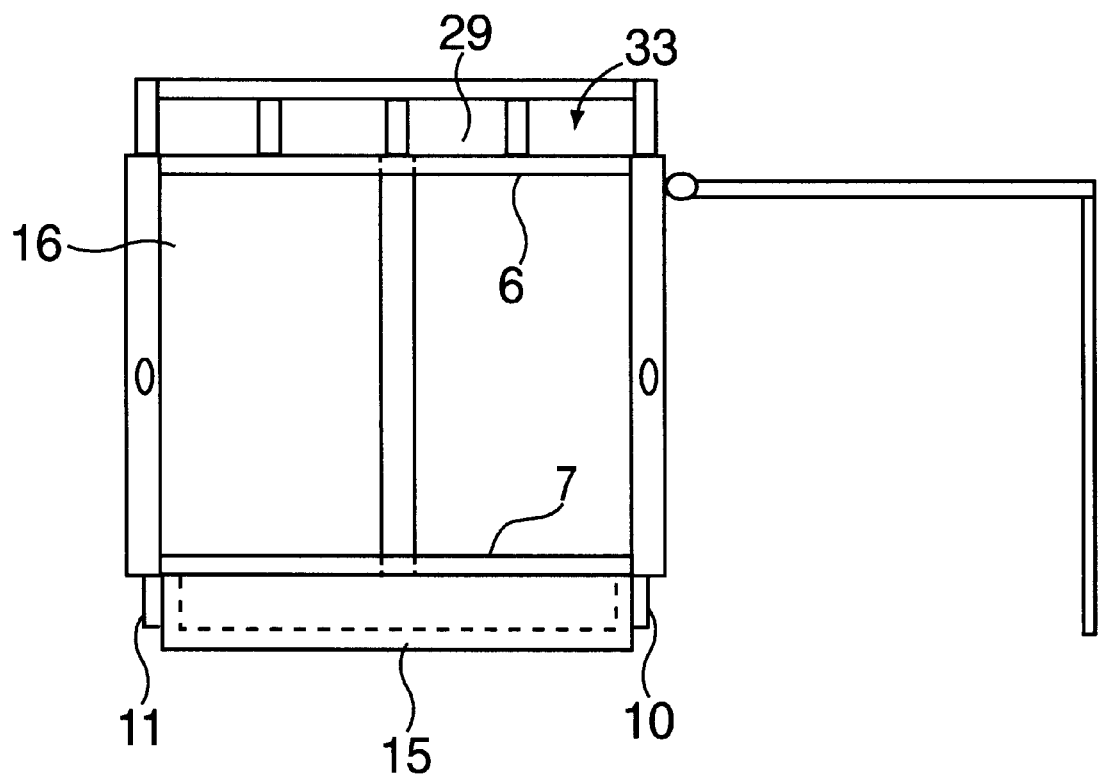
FIG. 3 is an end view of the mobile chiropractic vehicle with the awning extended and showing the French doors at the ramp portion of the mobile chiropractic vehicle.
Figure 4:
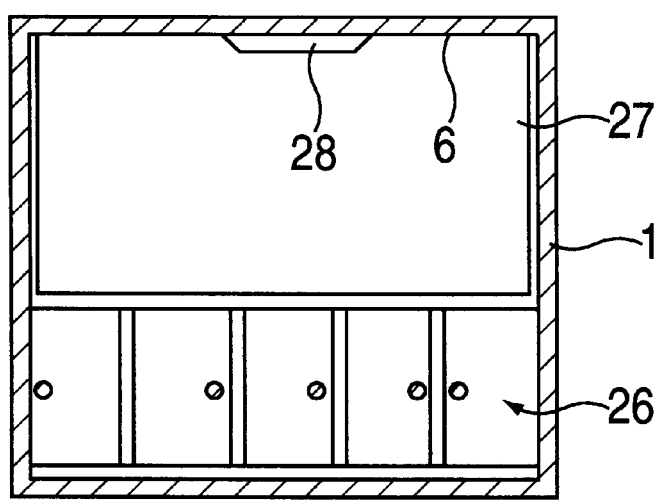
FIG. 4 is a view taken along line 4—4 of FIG. 2 showing the multimedia projector in the ceiling of the vehicle and the viewing area on the one of the two opposed end walls.

Referring to FIGS. 1–4, the mobile chiropractic vehicle comprises a rectangular enclosure 1 having two opposed end walls 2 and 3, two opposed lateral walls 4 and 5, a ceiling 6 and a floor 7 defining an interior area 8. At least one axle 9 having a pair of wheels 10 and 11 on opposite ends of the axle 9 with the axle 9 being secured transversely to the rectangular enclosure 1 adjacent the floor 7 to enable movement of the rectangular enclosure 1. Although one axle 9 would be sufficient, as illustrated in FIG. 1 a pair of axles 9 are provided to support the weight of the vehicle. A first means 11 associated with one of the two spaced end walls, such as end wall 2, enables transport of the enclosure 1 to selected locations. The first means 11 includes a trailer hitch 12 secured to the rectangular enclosure 1 adjacent end wall 2 and motorized equipment 13 detachably coupled to the trailer hitch 12 to transport the rectangular enclosure 1 to the selected locations. A second means 14 associated with the other of the two opposed end walls 3 provides handicapped access to the rectangular enclosure 1. Second means 14 includes a ramp 15 provided by at least a portion of the other of the two opposed end walls 3 and a French door 16 adjacent the other of the two opposed end walls 3 to close the opening formed when the other of the two opposed end walls 3 is deployed as ramp 15. A retractable means 17 is disposed between the opposed lateral walls 4 and 5 in a spaced relationship to the two opposed end walls 2 and 3 to divide the interior area 8 into a patient waiting area 18 adjacent the means 14 and an examining, diagnostic, demonstration and adjusting area 19 adjacent the end wall 2. Retractable means 17 includes a retractable curtain 20 disposed between the two opposed lateral walls 4 and 5 in a spaced relationship with the two opposed end walls 2 and 3 that may be retracted manually, or by an electric motor and the like. Such a floor arrangement is shown in FIG. 2.

Retractable curtain 20 would be opened a small amount to give patients waiting in the waiting area 18 access to the examining, diagnostic, demonstration and adjusting area 19.

The waiting area 18 includes therein furniture, such as a couch 22 and a number of chairs 23, to provide comfort for the patients waiting to be treated by the chiropractor. The examining, diagnostic, demonstration and adjusting area 19 includes an examining and adjusting table 24, diagnostic equipment 25 and cabinets 26 adjacent the end 2 to contain therein supplies necessary for the adjusting that the chiropractor may need. The wall on end 2 will also be, or contained, a viewing screen for the presentation of the video images provided by multimedia projector 28 secured to ceiling 6. All additional necessary equipment for the multimedia projection system would be contained in cabinet 28a.

An air conditioning unit 29 for the interior area 8 is mounted on the exterior of the enclosure 1 adjacent the ceiling 6. An awning 30 is secured to an exterior of at least one of the two opposed lateral walls adjacent the ceiling 6. The awning 30 is shown in FIG. 3 in the extended mode. A door or passageway 31 is provided in area 19 for the chiropractor and his assistants. As shown in FIG. 1, a caduceus 32 is provided on at least one of the opposed lateral walls, such as wall 5. A similar caduceus could be provided on the lateral wall 4.

As shown in FIGS. 1 and 3, an observation deck 33 with a diamond plate floor is provided at the rear portion of the roof of enclosure 1. Access to deck 33 is provided by ladder 34 located in area 18 and a roof hatch 35. An aluminum railing 36 is provided around deck 33.

A generator 37 to provide electrical power for the chiropractic vehicle is disposed on the tongue of hitch 12 adjacent end wall 2. The generator 37 would be accessible through a door 38A in a cover 38 for generator 37.

One example of the vehicle that could be used, in accordance with the principles of the present invention, is an auto trailer that is 24 foot long, 10 foot high and 8 foot wide with spring assisted rear ramp door 15. The rear ramp 15 is covered with aluminum diamond plate. Ceiling 6 would be clear fiberglass except in the area of deck 33. Two exterior 500 watt quartz flood lamps can be provide on the exterior of enclosure 1. Two external Boise speakers may also be provided to provide the educational features of this vehicle. The amplifier, etc. for the exterior speakers could be housed in cabinet 28a. The interior finish would be sheet aluminum. The French doors 16 are 6 foot wide and placed at the entrance of the ramp 15. The interior lighting are Halogen low volt track lighting having a length of 14' running parallel to both side walls 4 and 5 displaced approximately 2½' from walls 4 and 5. Side entrance door 31 includes a vertical window 15 inches by 30 inches. Electric baseboard heater provides heat when needed and a roof mounted air conditioner 29 provides cooling when needed. The entire floor 7 is aluminum diamond plate.

The therapeutic equipment would include an ultrasound unit, a portable electrical stimulating unit, a hydrocollator, and multimedia equipment including a digital projector and computer for slide presentations, a flat screen television, lap top, a VCR and an audio system including a CD and receiver with four speakers each located in a different corner of the enclosure 1. The diagnostic equipment would include diagnostic ultrasound, nerve conduction, EMG, videofluoroscopy and thermalography.

Figure 5:
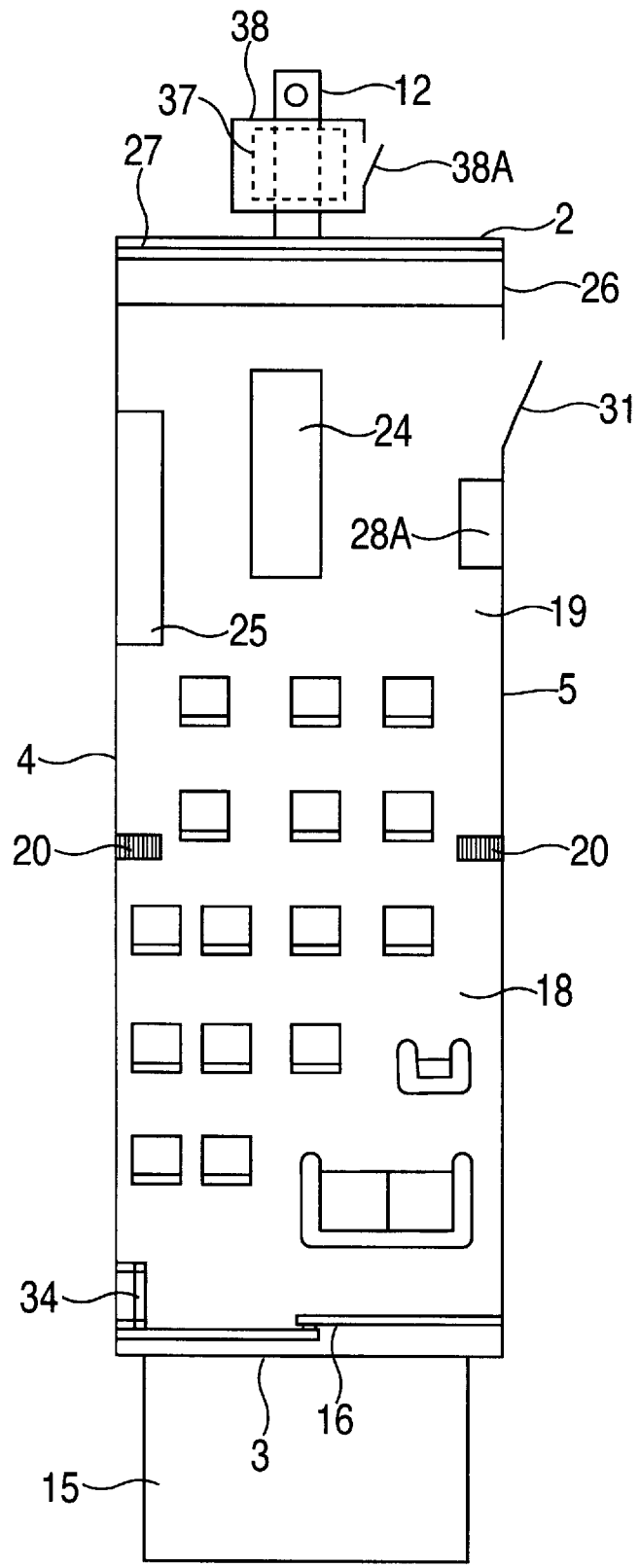
FIG. 5 is a floor plan of the mobile chiropractic vehicle of FIG. 1 with the retractable means open.

FIG. 5 shows how the interior of enclosure 1 would be arranged for viewing a multimedia presentation projected onto viewing screen 27.

While I have described above the principles of my invention in connection with specific apparatus, it is to be clearly understood that this description is made only by way of example and not as a limitation to the scope of my invention as set forth in the objects thereof and in the accompanying claims.

We claim:

1. A mobile chiropractic vehicle comprising;
    a rectangular enclosure having two opposed end walls, two opposed lateral walls, a ceiling and a floor defining an interior area;
    at least one axle having a pair of wheels, each on opposite ends of said axle, said at least one axle being secured transversely of said rectangular enclosure adjacent said floor to enable movement of said rectangular enclosure;
    first means associated with one of said two opposed end walls to transport said rectangular enclosure to selected locations;
    second means associated with the other of said two opposed end walls to provide handicap access to said rectangular enclosure; and
    retractable means capable of being opened and closed disposed between said two opposed lateral walls in a spaced relationship with said two opposed end walls to divide said interior area into a patient waiting area adjacent said second means and an examining, diagnostic and adjusting area adjacent said one of said two opposed end walls when said retractable means is closed and to provide a viewing area including substantially all of said interior area for a multimedia chiropractic presentation projected on said one of said two opposed end walls when said retractable means is open;
    said second means including
        a ramp provided by at least a portion of said other of said two opposed end walls, and
        a French door adjacent said other of said opposed end walls to close the opening formed when said other of said two opposed end walls is deployed as said ramp.
2. A vehicle according to claim 1, further including
    air conditioning means for said interior area mounted on an exterior of said rectangular enclosure adjacent said ceiling.
3. A vehicle according to claim 1, further including
    an awning secured to an exterior of at least one of said two opposed lateral walls adjacent said ceiling.
4. A vehicle according to claim 1, further including
    a generator to provide electrical power for said vehicle disposed on said first means, said generator being accessible through a door in an enclosure for for said generator secured to said first means.
5. A vehicle according to claim 2, further including
    an awning secured to an exterior of at least one of said two opposed lateral walls adjacent said ceiling.
6. A vehicle according to claim 5, further including
    a generator to provide electrical power for said vehicle disposed on said first means, said generator being accessible through a door in an enclosure for said generator secured to said first means.
7. A vehicle according to claim 1, wherein
    said retractable means includes
        a retractable curtain disposed between said two opposed lateral walls in a spaced relationship with said two opposed end walls to divide said interior area into said patient waiting area and said examing, diagnostic and adjusting area when said retractable curtain is closed and to provide said viewing area when said retractable curtain is open.
8. A mobile chiropractic vehicle comprising;
    a rectangular enclosure having two opposed end walls, two opposed lateral walls, a ceiling and a floor defining an interior area;
    at least one axle having a pair of wheels, each on opposite ends of said axle, said at least one axle being secured transversely to said rectangular enclosure adjacent said floor to enable movement of said rectangular enclosure;
    first means associated with one of said two opposed end walls to transport said rectangular enclosure to selected locations;
    second means associated with the other of said two opposed end walls to provide handicap access to said rectangular enclosure; and
    retractable means disposed between said two opposed lateral walls in a spaced relationship with said two opposed end walls to divide said interior area into a patient waiting area adjacent said second means and an examining, diagnostic and adjusting area adjacent said one of said two opposed end walls when said retractable means is closed and a viewing area for a multimedia chiropractic presentation projected on said one of said two opposed end walls when said retractable means is open;

said retractable means including
   a retractable curtain disposed between said two opposed lateral walls in a spaced relationship with said two opposed end walls to divide said interior area into said patient waiting area and said examing, diagnostic and adjusting area when said retractable curtain is closed and to provide said viewing area when said retractable curtain is open; and further including
   air conditioning means for said interior area mounted on an exterior of said rectangular enclosure adjacent said ceiling and an observation deck disposed adjacent said air conditioning means accessable by a ladder on the interior wall of said rectangular enclosure and a ceiling hatch.

9. A vehicle according to claim 8, further including
an awning secured to an exterior of at least one of said two opposed lateral walls adjacent said ceiling.

10. A vehicle according to claim 9, further including
a generator to provide electrical power for said vehicle disposed on said first means, said generator being accessible through a door in an enclosure for said generator secured to said first means.

11. A vehicle according to claim 8, further including
a generetor to provide electrical power for said vehicle disposed on said first means, said generator being accessible through a door in an enclosure for said generator secured said first means.

12. A vehicle according to claim 8, wherein
said first means includes
   a trailer hitch secured to said rectangular enclosure adjacent said one of said two opposed end walls, and
   motorized equipment detachably coupled to said trailer hitch to transport said rectangular enclosure to said selected locations.

13. A vehicle according to claim 12, further including
an awning secured to an exterior of at least one of said two opposed lateral walls adjacent said ceiling.

14. A vehicle according to claim 12, further including
a generator to provide electrical power for said vehicle disposed on said trailer hitch, said generator being accessible through a door in an enclosure for said generator secured to said trailer hitch.

15. A mobile chiropractic vehicle comprising:
a rectangular enclosure having two opposed end walls, two opposed lateral walls, a ceiling and a floor defining an interior area;

at least one axle having a pair of wheels, each on opposite ends of said axle, said at least one axle being secured transversely of said rectangular enclosure adjacent said floor to enable movement of said rectangular enclosure;

first means associated with one of said two opposed end walls to transport said rectangular enclosure to selected locations;

a viewing area including substantially all of said interior area for a multimedia chiropractic presentation projected on said one of said two opposed end walls;

a ramp provided by at least a portion of the other of said two opposed end walls to provide handicap access to said viewing area; and a French door adjacent said other of said two opposed end walls to close the opening formed when said at least a portion of said other of said two opposed end walls is deployed as said ramp.

* * * * *